(12) United States Patent
Kakino

(10) Patent No.: US 11,676,124 B2
(45) Date of Patent: Jun. 13, 2023

(54) CHECKOUT APPARATUS

(71) Applicant: TOSHIBA TEC KABUSHIKI KAISHA, Tokyo (JP)

(72) Inventor: Tomonari Kakino, Fuji Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/861,271

(22) Filed: Jul. 11, 2022

(65) Prior Publication Data
US 2022/0343309 A1     Oct. 27, 2022

Related U.S. Application Data

(63) Continuation of application No. 16/929,020, filed on Jul. 14, 2020, now Pat. No. 11,416,838, which is a
(Continued)

(30) Foreign Application Priority Data

Aug. 27, 2018  (JP) .............................. JP2018-158590

(51) Int. Cl.
  *G06Q 20/20*     (2012.01)
  *G07G 1/00*      (2006.01)
  (Continued)

(52) U.S. Cl.
  CPC ......... *G06Q 20/208* (2013.01); *G06K 7/1404* (2013.01); *G07G 1/0009* (2013.01); *G07G 1/0054* (2013.01); *G07G 1/01* (2013.01)

(58) Field of Classification Search
  CPC .. G06Q 20/208; G06K 7/1404; G07G 1/0009; G07G 1/0054; G07G 1/01
  (Continued)

(56) References Cited

U.S. PATENT DOCUMENTS 5,115,888 A  *  5/1992  Schneider ............ G06Q 20/208
                                                          235/383
7,909,248 B1 *  3/2011  Goncalves ............ G07G 1/0063
                                                          235/462.14
(Continued)

FOREIGN PATENT DOCUMENTS

EP          3076372 A1    10/2016
JP       H10-074287 A     3/1998
(Continued)

OTHER PUBLICATIONS

Notice of Reasons for Refusal dated Apr. 26, 2022 in corresponding Japanese Patent Application No. 2018-158590, 5 pages (with Translation).

(Continued)

*Primary Examiner* — Michael G Lee
*Assistant Examiner* — David Tardif
(74) *Attorney, Agent, or Firm* — Kim & Stewart LLP

(57) ABSTRACT

A checkout apparatus includes a memory that stores first information about one or more commodities registered in a registration process, a first interface configured to acquire an image of a predetermined region where registered commodities are to be placed, and a processor configured to identify commodities in the image acquired via the first interface by object recognition, determine whether each of the identified commodities is in the first information stored in the memory, and if one of the identified commodities is not in the first information, output an error signal.

16 Claims, 4 Drawing Sheets

Related U.S. Application Data continuation of application No. 16/523,412, filed on Jul. 26, 2019, now abandoned.

(51) Int. Cl.
*G06K 7/14* (2006.01)
*G07G 1/01* (2006.01)

(58) Field of Classification Search
USPC .......................................................... 235/383
See application file for complete search history.

(56) References Cited

U.S. PATENT DOCUMENTS

| | | | |
|---|---|---|---|
| 2006/0147087 A1* | 7/2006 | Goncalves | G06V 10/25 |
| | | | 382/173 |
| 2008/0061139 A1* | 3/2008 | Roquemore | G01G 19/4144 |
| | | | 235/383 |
| 2009/0212102 A1 | 8/2009 | Connell et al. | |
| 2009/0261164 A1 | 10/2009 | Sato et al. | |
| 2012/0127314 A1 | 5/2012 | Clements | |
| 2018/0240092 A1* | 8/2018 | Miyagi | G07G 1/0045 |
| 2018/0276456 A1* | 9/2018 | Miyagi | G06Q 20/208 |
| 2018/0314863 A1 | 11/2018 | Gao et al. | |
| 2020/0065793 A1* | 2/2020 | Kakino | G07G 1/0009 |

FOREIGN PATENT DOCUMENTS

| | | |
|---|---|---|
| JP | 2010-044479 A | 2/2010 |
| JP | 2011-54038 A | 3/2011 |

OTHER PUBLICATIONS

Extended European Search Report dated Feb. 7, 2020 in corresponding European Patent Application No. EP19190050.5, 8 pages.

\* cited by examiner

FIG. 3

| REGISTERED COMMODITY LIST | | |
|---|---|---|
| COMMODITY CODE | COMMODITY NAME | UNIT PRICE |
| 12345678910 | ○○○ | 100 |
| 23456789101 | ××× | 150 |

FIG. 4

| CONFIRMED COMMODITY LIST |
|---|
| COMMODITY CODE |
| 12345678910 |
| 23456789101 |

CHECKOUT APPARATUS

CROSS-REFERENCE TO RELATED APPLICATION

This application is a continuation of U.S. patent application No. is a continuation of U.S. patent application Ser. No. 16/929,020, filed Jul. 14, 2020, which is a continuation of U.S. patent application Ser. No. 16/523,412, filed Jul. 26, 2019, now abandoned, which is based upon and claims the benefit of priority from Japanese Patent Application No. 2018-158590, filed on Aug. 27, 2018, the entire contents of which are incorporated herein by reference.

FIELD

Embodiments described herein relate generally to a checkout apparatus.

BACKGROUND

In a point of sale (POS) system that performs a settlement process for commodities, all of the commodities need to be registered correctly. In a self-service checkout apparatus, a customer operates the apparatus to register the commodities and perform the settlement process by himself or herself. Therefore, the settlement process may often be started before all the commodities have been registered correctly. A conventional self-service register monitors, based on an image photographed by a separately installed camera, whether a barcode of a commodity is correctly scanned by a scanner. However, such a self-service register requires the image of the commodity to be photographed during reading operation of the barcode of the commodity, and thus cannot check whether a commodity that does not have a barcode and is not scanned by the scanner has been registered correctly.

DESCRIPTION OF THE DRAWINGS

FIG. 3 is a diagram illustrating a registered commodity list in the checkout apparatus.

FIG. 4 is a diagram illustrating an example of a confirmed commodity list in the checkout apparatus.

DETAILED DESCRIPTION

Embodiments provide a checkout apparatus that can detect an unregistered commodity in a sales transaction.

According to an embodiment, a checkout apparatus includes a memory that stores first information about commodities registered in a registration process, a first interface configured to acquire an image of a predetermined region where the registered commodities are to be placed, and a processor configured to identify commodities in the image acquired via the first interface by object recognition, determine whether each of the identified commodities is in the first information stored in the memory, and if one of the identified commodities is not in the first information, output an error signal.

An example embodiment is explained below with reference to the drawings.

Figure 1:
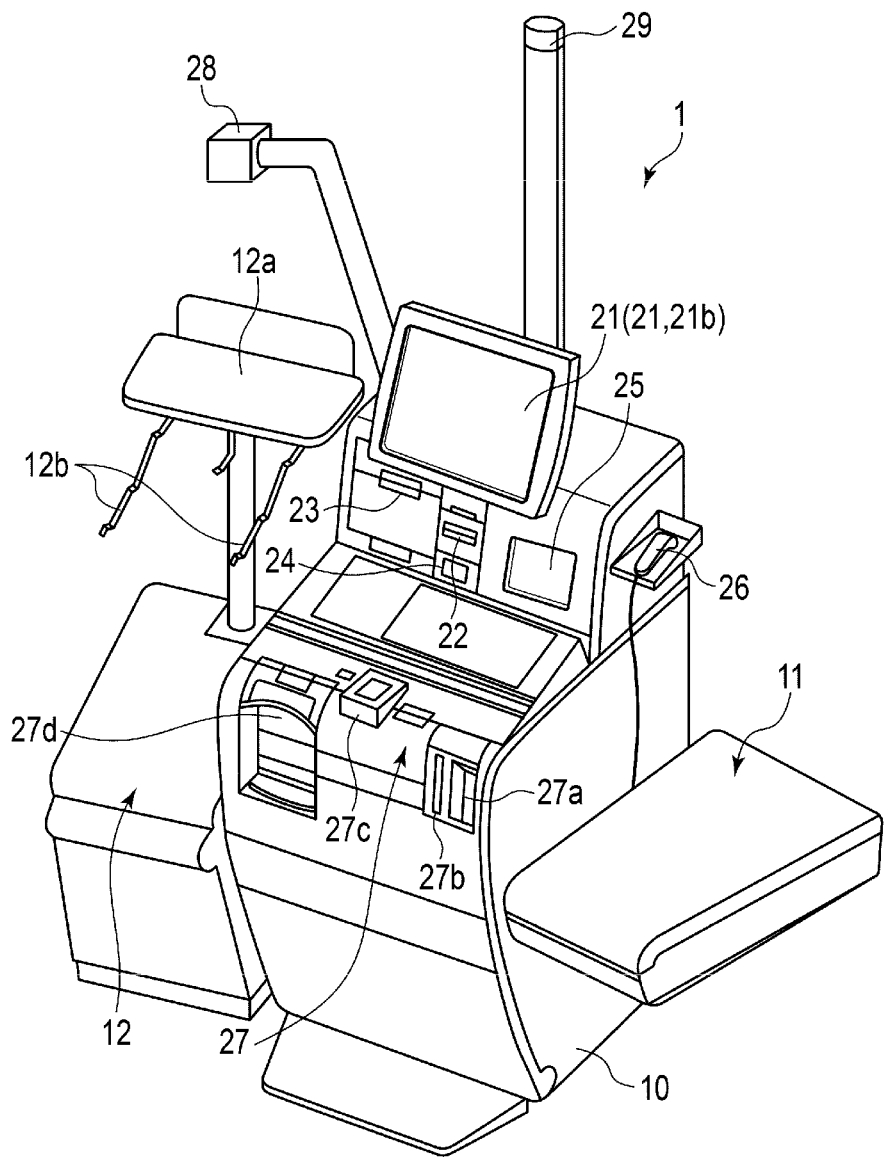
FIG. 1 is a diagram illustrating the exterior of a checkout apparatus according to an embodiment.

FIG. 1 is a diagram illustrating the exterior of a checkout apparatus 1 according to this embodiment.

The checkout apparatus 1 illustrated in FIG. 1 is a self-service register that performs a commodity registration process and a settlement process in response to an operation of a customer who purchases commodities. However, the checkout apparatus 1 may instead be an apparatus operated by a store clerk or the like. A configuration explained below may be applied to any commodity recognition or registration apparatus in a POS system.

As illustrated in FIG. 1, the checkout apparatus 1 includes a main body 10 and a first commodity placing table 11 and a second commodity placing table 12 disposed on the left and the right of the main body 10. Commodities before registration are placed on the first commodity placing table 11. In a configuration example illustrated in FIG. 1, the first commodity placing table 11 is disposed on the right side of the main body 10 when viewed from the front of the main body 10. For example, a basket for storing commodities to be purchased by a customer is placed on the first commodity placing table 11. The commodities to be purchased by the customer may be directly placed on the first commodity placing table 11. The commodities before registration may be stored in a cart and disposed in a predetermined position.

Commodities after registration are placed on the second commodity placing table 12. A storage container, such as a basket, a box, a cart, or a bag, which stores the registered commodities may be placed on the second commodity placing table 12. In the configuration example illustrated in FIG. 1, the second commodity placing table 12 is disposed on the left side of the main body 10 when viewed from the front of the main body 10. Commodities taken out from the first commodity placing table 11 and subjected to the registration process are placed on the second commodity placing table 12. For example, commodities, barcodes of which have been read in the main body 10, or commodities, commodity information of which has been input by key operation, are placed on the second commodity placing table 12.

A temporarily placing table 12a is a table for temporarily placing the registered commodities and may be disposed above the second commodity placing table 12. In the configuration example illustrated in FIG. 1, the temporarily placing table 12a is provided above the second commodity placing table 12 and supported by a pole. The temporarily placing table 12a is used for, for example, temporarily placing the registered commodities before storing the registered commodities in a shopping bag or the like. Further, a mechanism for holding a bag or a box for storing the registered commodities may be provided above the second commodity placing table 12. In the configuration example illustrated in FIG. 1, as the mechanism for holding the bag or the box, two holding arms 12b including separated left and right arms are attached to the temporarily placing table 12a. For example, the holding arms 12b holds the shopping bag in an opened state.

As illustrated in FIG. 1, a display device 21, a card reader writer (RW) 22, a printer 23, a speaker 24, a scanner 25, a hand scanner 26, and a cash processing machine 27 are provided in the main body 10. Further, a camera 28 is provided above the main body 10 and supported by a pole.

The display device 21 includes a display device 21a and a touch panel 21b. The display device 21a displays operation guidance, icons or touch keys selectable by the customer, a warning message serving as an alert, or the like. The display device 21a is, for example, an LCD (Liquid Crystal Display). The touch panel 21b detects a touch position by the customer on a display screen displayed by the display device 21a. The touch panel 21b sends information indicating the detected touch position to a processor explained below.

For example, the display device 21a displays a GUI (Graphical User Interface) for the customer to input a selection instruction for a payment method (e.g., cash or credit card) and various kinds of information by touch operation. The display device 21a displays a guidance screen, an information input screen, a commodity registration screen, a settlement screen, and the like. The guidance screen is a screen for displaying guidance, such as a message for informing the customer of an operation method. The information input screen is, for example, an operation screen for inputting information concerning commodities on which barcodes are not attached. The commodity registration screen is a screen for displaying information concerning registered commodities. On the commodity registration screen, information concerning, for example, commodities identified by barcodes read by the scanner 25 or the hand scanner 26 and commodities designated by key operation is displayed. The settlement screen is a screen for displaying a total number of commodities to be purchased, a deposit amount, a change due amount, and the like in the settlement process in which the customer makes payment for the purchased commodities.

The card reader writer (RW) 22 reads a card and processes information read from the card. The card reader writer 22 includes a card insertion port. The card reader writer 22 has a function of reading data recorded in the card and a function of writing data into the card. The card reader writer 22 may accept a magnetic card that records magnetic information or a contact or contactless IC card. The card reader writer 22 may include a mechanism that processes a plurality of kinds of cards.

For example, the card reader writer 22 accepts a card such as a credit card for settlement or a member card inserted into the card insertion port. As the card for settlement, a credit card, a debit card, an electronic money card, a prepaid card, and the like may be used. As the member card, a member's card in which member information is recorded, a point card in which points usable as services are recorded, and the like can be used.

The printer 23 prints a receipt. The printer 23 includes a receipt issue port. The printer 23 prints various character strings, images, and the like on a receipt sheet to thereby issue a receipt. The printer 23 may be, for example, a thermal printer or a dot impact printer. For example, if a settlement process is completed, the printer 23 prints the detail of the transaction on the receipt and discharges the receipt from the receipt issue port.

The speaker 24 outputs warning sound or message, for example.

The scanner 25 and the hand scanner 26 read information for identifying and registering a commodity. In this embodiment, the scanner 25 and the hand scanner 26 read a barcode attached to a commodity as information for identifying the commodity. The scanner 25 optically reads a barcode of a commodity over which the customer holds up the scanner 25 such that the scanner 25 is opposed to the barcode attached to the commodity. The hand scanner 26 is hand-held and operated by the customer. The hand scanner 26 is brought close to the barcode attached to the commodity to thereby optically read the barcode. The scanner 25 and the hand scanner 26 only have to read information for recognizing the commodity and may read, for example, information other than the barcode.

The cash processing machine 27 receives and dispenses cash. The cash processing machine 27 includes a bill depositing port, a bill discharging port, a coin depositing port, and a coin discharging port. The cash processing machine 27 receives bills deposited in a bill depositing port 27a. The cash processing machine 27 discharges bills from a bill discharging port 27b. The cash processing machine 27 receives coins deposited in a coin depositing port 27c. The cash processing machine 27 discharges coins from a coin discharging port 27d.

The camera 28 photographs an image of a region where registered commodities should be placed (hereinafter called the "registered commodity disposition region"). In this example, the camera 28 is configured such that the registered commodity disposition region is included in a photographing range of the camera 28. However, the camera 28 is only required to photograph the commodities being registered by the customer.

For example, in a situation where the registered commodities are placed on the second commodity placing table 12 or the temporarily placing table 12a, the photographing range is set such that the camera 28 photographs the entire second commodity placing table 12 and the entire temporarily placing table 12a. Ina situation where a basket storing the registered commodities is placed on the second commodity placing table 12, the photographing range is set such that the camera 28 photographs the inside of the basket placed on the second commodity placing table 12. In a situation where a bag or a container, such as a basket or a box, in which the registered commodities are stored, is held by the holding arms 12b, the photographing range is set such that the camera 28 photographs the inside of the bag held by the holding arms 12b. Further, in a situation where a cart storing the registered commodities is disposed in a predetermined position (e.g., beside the second commodity placing table 12), the photographing range is set such that the camera 28 photographs the inside of the cart disposed in the predetermined position.

An indicator 29 is a display device that flashes light. For example, the indicator 29 flashes light to inform customers and an administrator of a state of the checkout apparatus 1, such as in use, standby, and needing assistance. By flashing the light, the indicator 29 informs the customers and the administrator of the state of the checkout apparatus 1. The indicator 29 may flash a light of a predetermined color when it is detected that an unregistered commodity is present in the registered commodity disposition region.

The configuration of a control system in the checkout apparatus 1 is explained.

Figure 2:
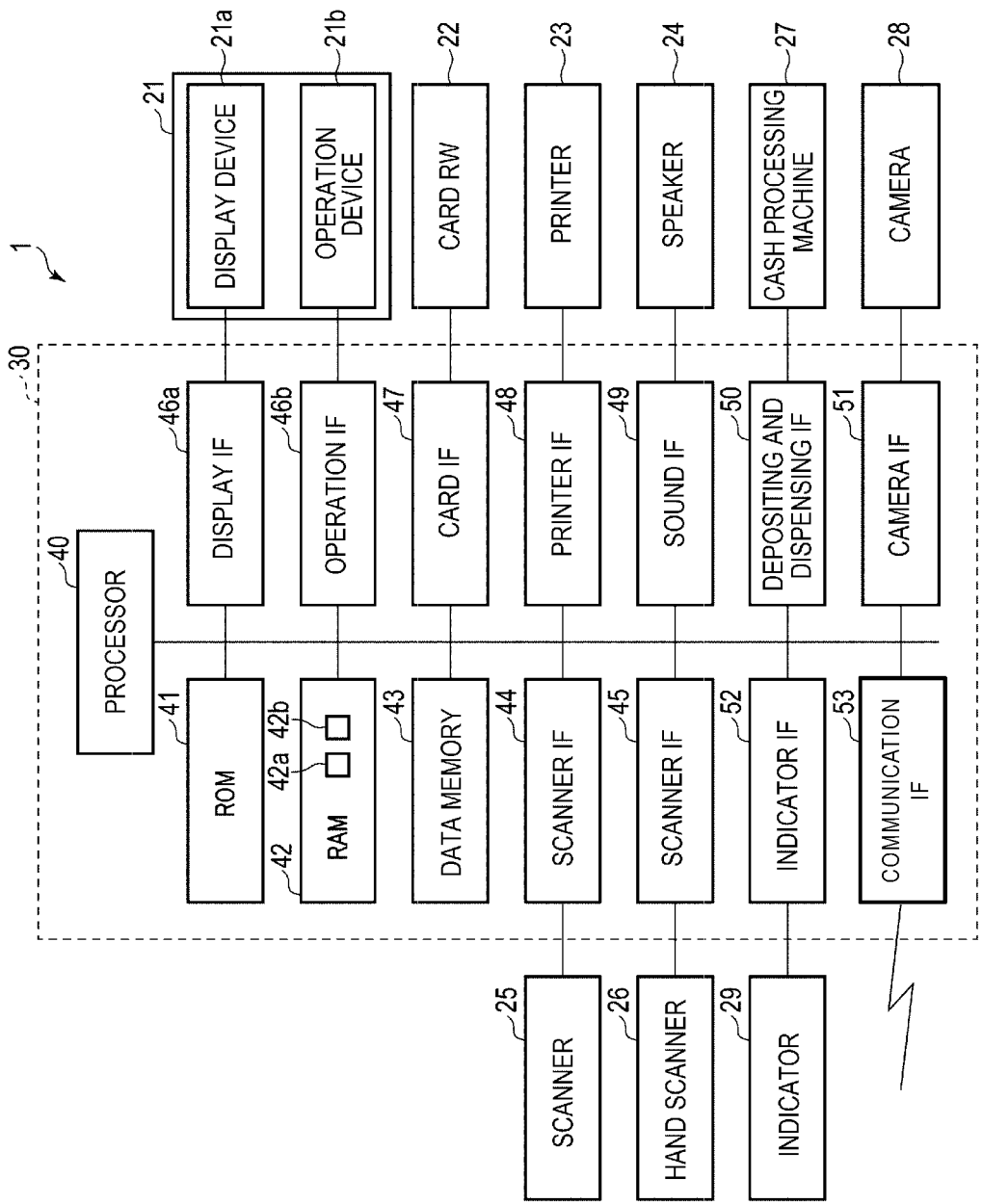
FIG. 2 is a block diagram illustrating a configuration example of a control system in the checkout apparatus.

FIG. 2 is a block diagram illustrating a configuration example of the control system in the checkout apparatus 1.

In the configuration example illustrated in FIG. 2, the main body 10 of the checkout apparatus 1 includes a control unit 30. The control unit 30 may be implemented by a generic computer or the like. The display device 21, the card reader writer 22, the printer 23, the speaker 24, the scanner 25, the hand scanner 26, the cash processing machine 27, the camera 28, and the like are electrically connected to the control unit 30. The control unit 30 includes a processor 40, a ROM (read-only memory) 41, a RAM (random-access memory) 42, a data memory 43, various interfaces (IFs) 44 to 52, and a communication IF 53.

The checkout apparatus 1 may be connected to a computer such as a server via a network such as a LAN (local area network). For example, the checkout apparatus 1 may be connected to other checkout apparatuses and a store computer, which manages data for the entire store, via a network. In such a system, the checkout apparatus 1 may acquire, for example, information concerning commodities from the store computer as appropriate.

The processor 40 executes various kinds of processing by executing computer programs. The processor 40 is, for example, a CPU (central processing unit). The processor 40 realizes various functions by executing computer programs stored by the ROM 41 or the data memory 43. For example, by executing a computer program for commodity registration, the processor 40 executes, as a registration mode, a process for registering commodities. By executing a computer program for settlement, the processor 40 executes, as a settlement mode, a settlement process for the commodities purchased by the customer. By executing a computer program for commodity confirmation, the processor 40 executes, as a commodity confirmation mode, a commodity confirmation process for detecting the presence or absence of unregistered commodities.

The ROM 41 is a nonvolatile memory and stores computer programs and data. For example, the ROM 41 stores computer programs such as an operating system, middleware, and applications. The ROM 41 may store data referred to by the processor 40 in executing the various kinds of programs.

The RAM 42 is a memory used as a working area. The RAM 42 stores, as appropriate, data referred to by the processor 40 in executing the various kinds of programs, data temporarily used by the processor 40, or the like.

The data memory 43 is a memory that stores data. The data memory 43 is a rewritable nonvolatile memory. The data memory 43 is, for example, an EEPROM® (electrically erasable programmable read-only memory), an HDD (hard disk drive), or an SSD (solid state drive). The data memory 43 stores data used by the processor 40 in executing the various kinds of programs or data generated in executing the programs by the processor 40. The data memory 43 may store various computer programs executed by the processor 40. For example, the data memory 43 may store a computer program for registration, a computer program for settlement, and a computer program for commodity confirmation.

The RAM 42 or the data memory 43 stores information concerning commodities registered in the commodity registration. In the configuration example illustrated in FIG. 2, a storage region 42*a* is a region in the RAM 42. The RAM 42 stores the information concerning the registered commodities as data in a list format (hereinafter called "the registered commodity list"). The RAM 42 or the data memory 43 stores an image captured by the camera 28. For example, the data memory 43 may store video data obtained by adding a time stamp indicating capture time for the image photographed by the camera 28. The RAM 42 or the data memory 43 stores information concerning commodities that have been recognized from the image from the camera 28 (hereinafter called "the confirmed commodities"). In the configuration example illustrated in FIG. 2, a storage region 42*b* is a region in the RAM 42. The RAM 42 stores the information concerning the confirmed commodities as data in a list format (hereinafter called "the confirmed commodity list").

The processor 40 is connected to the scanner 25 via a scanner IF 44. The processor 40 acquires, via the scanner IF 44, an image scanned by the scanner 25. The processor 40 is connected to the hand scanner 26 via a scanner IF 45. The processor 40 acquires, via the scanner IF 45, an image scanned by the hand scanner 26. The processor 40 decodes a barcode included in the image scanned by the scanner 25 or the hand scanner 26 to thereby identify a commodity indicated by the barcode.

The processor 40 is connected to the display device 21 via a display IF 46*a* and an operation IF 46*b*. The processor 40 controls, via the display IF 46*a*, display content displayed by the display device 21*a*. The processor 40 acquires, via the operation IF 46*b*, information indicating a touch position detected by the touch panel 21*b*. For example, the processor 40 controls the display device 21 to display a message as an alert or an indicator for informing that an unregistered commodity is present. The processor 40 detects, with the information indicating the touch position, inputs to the icons or the touch keys displayed on the display device 21*a*.

The processor 40 is connected to the card reader writer 22 via a card IF 47. The processor 40 controls the card reader writer 22 to access the card via the card IF 47. For example, the processor 40 executes the settlement process by credit card read by the card reader writer 22.

The processor 40 is connected to the printer 23 via a printer IF 48. The processor 40 controls the printer 23 via the printer IF 48. For example, the processor 40 controls the printer 23 to issue a receipt indicating a result of the settlement process.

The processor 40 is connected to the speaker 24 via a sound IF 49. The processor 40 controls, via the sound IF 49, sound output from the speaker 24. For example, the processor 40 controls the speaker 24 to output sound or buzzer as an alert for informing that an unregistered commodity is present in the registered commodity disposition region.

The processor 40 is connected to the cash processing machine 27 via a depositing and dispensing IF 50. The processor 40 controls the cash processing machine 27 via the depositing and dispensing IF 50. For example, the cash processing machine 27 counts cash deposited by the customer. The processor 40 acquires information indicating a deposit amount counted by the cash processing machine 27. The processor 40 controls the cash processing machine 27 to dispense change calculated from the deposited amount and a total amount of the registered commodities.

The processor 40 is connected to the camera 28 via a camera IF 51. The processor 40 acquires, via the camera IF 51, an image photographed by the camera 28. For example, the camera 28 photographs the registered commodity disposition region at a predetermined period and outputs a photographed image to the processor 40. The processor 40 may instruct the camera 28 to photograph an image via the camera IF 51, and acquire, via the camera IF 51, the image photographed by the camera 28.

A registered commodity list created in the commodity registration process by the checkout apparatus 1 according to this embodiment is explained.

FIG. 3 is a diagram illustrating an example of a registered commodity list in the checkout apparatus according to this embodiment.

The registered commodity list illustrated in FIG. 3 is stored in, for example, the storage region 42*a* in the RAM 42. In the example illustrated in FIG. 3, a commodity code, a commodity name, and a unit price are stored in the registered commodity list for each registered commodity. In the commodity registration process, the processor 40 adds, every time a commodity is registered, a commodity code, a commodity name, and a unit price of the registered commodity to the registered commodity list.

A confirmed commodity list created in the commodity confirmation process by the checkout apparatus 1 is explained.

FIG. 4 is a diagram illustrating an example of a confirmed commodity list in the checkout apparatus 1.

The confirmed commodity list illustrated in FIG. 4 is stored in, for example, the storage region 42b in the RAM 42.

In the example illustrated in FIG. 4, a commodity code is stored in the confirmed commodity list for each commodity present in the registered commodity disposition region. The information registered in the confirmed commodity list can be compared with the information registered in the registered commodity list. For example, the information includes a commodity name. In the commodity confirmation process, the processor 40 recognizes respective commodities from an image obtained by the camera 28 photographing the registered commodity disposition region. The processor 40 stores, in the confirmed commodity list, commodity codes of the commodities that can be recognized from the image photographed by the camera 28. If a commodity that has been already detected is detected again from the image photographed by the camera 28, the processor 40 may not additionally store the commodity code of the commodity.

A checkout process including commodity registration and confirmation performed by the checkout apparatus 1 is explained.

Figure 5:
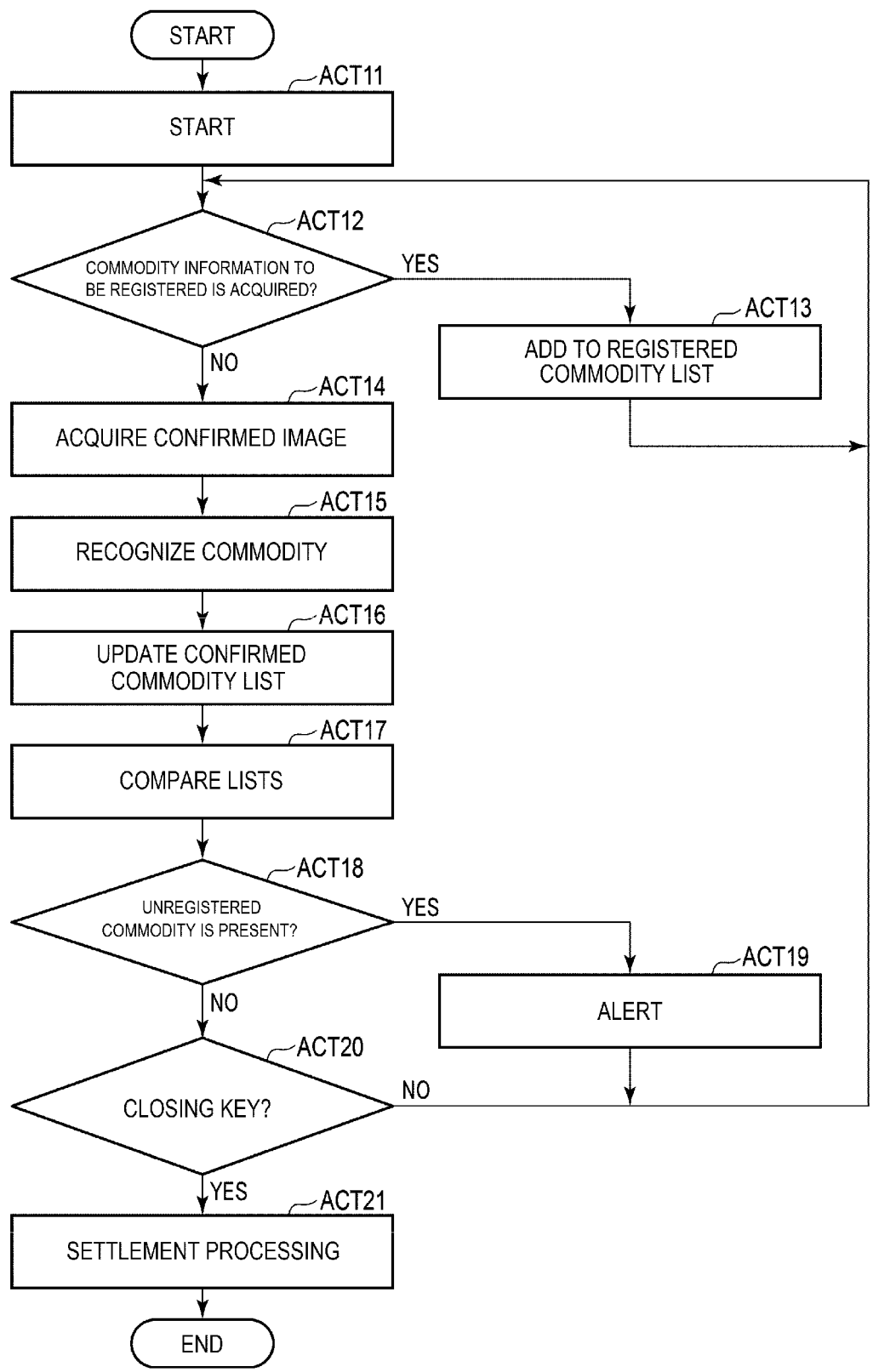
FIG. 5 is a flowchart of a checkout processing in the checkout apparatus.

FIG. 5 is a flowchart for explaining operations performed by the checkout processing in the checkout apparatus 1.

It is assumed that the customer selects commodities to be purchased and comes to the front of the checkout apparatus 1. The customer sets the unregistered commodities (hereinafter called "the settlement target commodities") in a predetermined position on the checkout apparatus 1. For example, the customer places a basket storing the settlement target commodities on the first commodity placing table 11. The customer may directly place the commodities to be purchased on the first commodity placing table 11 instead of using a basket or the like. The customer may place a cart storing the commodities to be purchased in a predetermined position.

After setting the settlement target commodities in the predetermined position, the customer operates the checkout apparatus 1 to start the checkout process. For example, the customer touches a touch key displayed on the display device 21 to thereby instruct the start of the checkout process. Alternatively, the processor 40 may recognize the start of the checkout process by detecting a movement of the customer. For example, the processor 40 may analyze an image photographed by the camera 28 to recognize the movement of the customer and may determine whether to start the checkout process according to the recognized movement of the customer.

The processor 40 of the checkout apparatus 1 starts, according to the start instruction for the checkout process, the registration process for registering the settlement target commodities and the confirmation process for confirming that all of the commodities to be purchased are correctly registered (ACT 11). In this embodiment, the processor 40 executes the commodity registration process and the commodity confirmation process in parallel. The commodity registration process is a process for registering the information concerning the settlement target commodities. In the commodity registration process, the processor 40 stores the information concerning the registered commodities in the registered commodity list. The commodity confirmation process is a process for confirming whether the commodities present in the registered commodity disposition region are the ones that have been registered in the commodity registration process. In the commodity confirmation process, the processor 40 stores information concerning the commodities present in the registered commodity disposition region in the confirmed commodity list.

That is, if the checkout process is started, the processor 40 continuously executes, as the commodity registration process, a process for acquiring information concerning a settlement target commodity (ACTS 12 to 13). When the information concerning the settlement target commodity is acquired (YES in ACT 12), the processor 40 adds the acquired information concerning the commodity to the commodity registration list (ACT 13). The information concerning the settlement target commodity may be specified from a barcode read by the scanner 25 or the hand scanner 26 or may be acquired by key operations performed by the customer using the display device 21 or the like.

For example, during the execution of the commodity registration process, the processor 40 sets the scanner 25 and the hand scanner 26 in a state in which a barcode of a commodity can be read. The customer holds up the settlement target commodity over a reading position of the scanner 25 or the hand scanner 26 to scan the barcode. The scanner 25 or the hand scanner 26 reads the barcode held over the reading position and outputs a result of the reading to the processor 40. The processor 40 identifies the commodity based on the reading result output from the scanner 25 or the hand scanner 26. If the commodity is identified from the barcode read by the scanner 25 or the hand scanner 26, the processor 40 adds information concerning the read commodity in the registered commodity list.

The processor 40 may receive an input operation for the customer to input commodity information on the display device 21 or the like. For example, the customer inputs, with the touch panel 21b, information concerning a commodity registered by a key operation on an input screen displayed by the display device 21a. If the information concerning the commodity is input by the touch panel 21b, the processor 40 adds the input information concerning the commodity in the registered commodity list.

The processor 40 executes the commodity confirmation process in parallel to the commodity registration process. As the commodity confirmation process, the processor 40 acquires an image photographed by the camera 28 (ACT 14). The camera 28 outputs the image obtained by photographing the photographing range including the registered commodity disposition region to the processor 40 via the camera IF 51. For example, the processor 40 acquires the image photographed by the camera 28 at a predetermined period. The processor 40 may acquire the image photographed by the camera 28 when a sensor detects a movement or the like of an object in the registered commodity disposition region.

If the image photographed by the camera 28 is acquired, the processor 40 executes a commodity recognition process for recognizing respective commodities included in the acquired image (ACT 15). For example, the processor 40 detects a commodity image from the image acquired from the camera 28 and recognizes the commodity from the detected commodity image. However, the processor 40 may recognize the commodity in a differential image between the image acquired from the camera 28 and an image acquired from the camera 28 immediately before the image. The information concerning the commodity may be specified based on a barcode detected from the commodity image or generic objection recognition according to a shape or a package image of the commodity in the commodity image.

After executing the commodity recognition process based on the image acquired from the camera 28, the processor 40 updates the confirmed commodity list based on a result of the commodity recognition process (ACT 16). For example, if a commodity not included in the confirmed commodity list is detected by the commodity recognition process, the processor 40 adds information (e.g., a commodity code) concerning the commodity to the confirmed commodity list. Consequently, the commodities placed on the registered commodity disposition region and included in the photographing range are sequentially added in the confirmed commodity list.

After updating the confirmed commodity list based on the result of the commodity recognition process, the processor 40 compares the confirmed commodity list and the registered commodity list (ACT 17). The processor 40 determines, based on the comparison of the confirmed commodity list and the registered commodity list, whether an unregistered commodity is present in the registered commodity disposition region (ACT 18).

For example, the processor 40 confirms whether all commodities in the confirmed commodity list are registered in the registered commodity list. The processor 40 confirms that there is no unregistered commodity in the registered commodity disposition region. That is, if a commodity in the confirmed commodity list is absent from the registered commodity list, the processor 40 determines that an unregistered commodity is present in the registered commodity disposition region. If all the commodities in the confirmed commodity list are in the registered commodity list, the processor 40 determines that all commodities detected from the image photographed by the camera 28 are registered commodities.

However, the checkout apparatus according to this embodiment does not confirm whether all the commodities included in the registered commodity list are present in the confirmed commodity list. That is, the checkout apparatus according to this embodiment confirms whether all the commodities in the confirmed commodity list have been registered. Consequently, the checkout apparatus according to the embodiment can check for an unregistered commodity even in a situation in which all the commodities present in the registered commodity disposition region cannot be accurately recognized.

If determining that an unregistered commodity is present in the registered commodity disposition region (YES in ACT 18), an alert is output (ACT 19). For example, the processor 40 controls the display device 21a to display information indicating the presence of the unregistered commodity. The processor 40 may flash the indicator 29 to indicate an error. Further, the processor 40 may notify, via the communication IF 53, an external apparatus, such as a management apparatus, that the unregistered commodity is in the registered commodity disposition region.

After the alert is output, the processor 40 returns to ACT 12 and executes the commodity registration process and the commodity confirmation process explained above while maintaining the alert. Consequently, if determining that an unregistered commodity is absent in the registered commodity disposition region (NO in ACT 18), the alert is turned off.

If determining that an unregistered commodity is absent in the registered commodity disposition region (NO in ACT 18), the processor 40 detects an input of a closing key as an end instruction for the checkout process, made by the customer via the touch panel 21b (ACT 20). If the closing key is not input (NO in ACT 20), the processor 40 returns to ACT 12 and executes the steps explained above again. If the closing key is input (YES in ACT 20), the processor 40 executes the settlement process for the commodities registered in the registered commodity list (ACT 21). For example, the processor 40 calculates a total amount of payment for all the commodities registered in the registered commodity list. The processor 40 controls the display device 21a to display the calculated total amount and performs a payment processing. If the payment is completed, the processor 40 ends the checkout process for the customer.

As explained above, the checkout apparatus according to this embodiment executes, in parallel to the commodity registration process, a process for confirming whether an unregistered commodity is present in the registered commodity disposition region. The checkout apparatus recognizes commodities present in an image obtained by the camera photographing the registered commodity disposition region, and determines whether all the recognized images are present in the registered commodity list. If the commodity present in the registered commodity disposition region is absent in the registered commodity list, the checkout apparatus outputs an alert for informing that an unregistered commodity is present in the registered commodity disposition region.

Consequently, the checkout apparatus can confirm, in parallel to the commodity registration process, in the image photographed by the camera, whether an unregistered commodity is placed in the registered commodity disposition region. If determining that an unregistered commodity is present in the registered commodity disposition region, the checkout apparatus can output an alert. As a result, the checkout apparatus can inform the customer, the administrator, and the like that the unregistered commodity is placed in the registered commodity disposition region. It is possible to prevent the settlement process from being executed when one or more unregistered commodities are present.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A self-service checkout apparatus, comprising:
   a self-service scanner;
   a memory;
   a first table where one or more commodities to be registered using the scanner are placed;
   a second table where one or more commodities that have been registered using the scanner are placed;
   a third table disposed above the second table and on which one or more commodities that have been registered using the scanner are placed;
   a camera configured to acquire an image of surfaces of the second and third tables; and
   a processor configured to:
      upon receipt of one or more first commodity codes from the scanner, store the first commodity codes in the memory,
      perform object recognition on the image to identify one or more commodities shown in the image, and store one or more second commodity codes of the identified commodities in the memory, determine whether the second commodity codes match the first commodity codes, and upon determining that the second commodity codes do not match the first commodity codes, output an error signal.

2. The self-service checkout apparatus according to claim 1, further comprising:

an arm for holding a bag that stores one or more commodities that have been registered using the scanner, wherein the arm is attached to the third table.

3. The self-service checkout apparatus according to claim 2, wherein the arm is positioned above the second table such that an inside of the bag is imaged by the camera.

4. The self-service checkout apparatus according to claim 1, further comprising:

a display device having a touch panel through which an input for starting a self-service settlement process is made, wherein the processor is further configured to not start the self-service settlement process when the second commodity codes do not match the first commodity codes even if the input for starting the self-service settlement process is made via the touch panel.

5. The self-service checkout apparatus according to claim 1, wherein the first and second commodity codes are stored in a form of a list.

6. The self-service checkout apparatus according to claim 1, further comprising:

a display device, wherein the processor is further configured to, when the second commodity codes do not match the first commodity codes, generate a screen to be displayed on the display device and indicating an error message.

7. The self-service checkout apparatus according to claim 1, further comprising:

a lamp, wherein when the error signal is output, the lamp flashes.

8. The self-service checkout apparatus according to claim 1, further comprising:

a display device having a touch panel through which a commodity code is input, wherein the processor is further configured to, upon receipt of an input of a commodity code via the display device, store the input commodity code in the memory as a first commodity code.

9. A self-service checkout method, comprising:

performing self-service commodity registration on one or more commodities placed on a first table using a self-service scanner, thereby storing one or more first commodity codes of the commodities in a memory;

acquiring an image of surfaces of second and third tables where registered commodities are placed, using a camera, the second table disposed above the third table;

performing object recognition on the image to identify one or more commodities shown in the image, and storing one or more second commodity codes of the identified commodities in the memory;

determining whether the second commodity codes match the first commodity codes; and upon determining that the second commodity codes do not match the first commodity codes, outputting an error signal.

10. The method according to claim 9, wherein an inside of a bag that is held by an arm attached to the third table and stores one or more registered commodities, is imaged using the camera.

11. The method according to claim 10, wherein the arm is positioned above the second table.

12. The method according to claim 9, further comprising:

receiving an input of starting a self-service settlement process, but not starting the self-service settlement process when the second commodity codes do not match the first commodity codes.

13. The method according to claim 9, wherein the first and second commodity codes are stored in a form of a list.

14. The method according to claim 9, further comprising:

upon receipt of the error signal, displaying an error message.

15. The method according to claim 9, further comprising:

upon receipt of the error signal, flashing a light using a lamp.

16. The method according to claim 9, further comprising:

receiving an input of a commodity code via a touch panel, and storing the input commodity code in the memory as a first commodity code.

* * * * *